US012614064B2

(12) United States Patent
Miao et al.

(10) Patent No.: US 12,614,064 B2
(45) Date of Patent: Apr. 28, 2026

(54) NEUROMORPHIC VISION SYSTEM

(71) Applicant: NANJING UNIVERSITY, Nanjing (CN)

(72) Inventors: Feng Miao, Nanjing (CN); Shijun Liang, Nanjing (CN); Shuang Wang, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 645 days.

(21) Appl. No.: 17/924,740

(22) PCT Filed: Aug. 28, 2020

(86) PCT No.: PCT/CN2020/111973
§ 371 (c)(1),
(2) Date: Nov. 11, 2022

(87) PCT Pub. No.: WO2022/041091
PCT Pub. Date: Mar. 3, 2022

(65) Prior Publication Data
US 2023/0186060 A1 Jun. 15, 2023

(30) Foreign Application Priority Data

Aug. 26, 2020 (CN) .......................... 202010868408.6

(51) Int. Cl.
*G06N 3/065* (2023.01)
*G06N 3/063* (2023.01)
(52) U.S. Cl.
CPC ............. *G06N 3/063* (2013.01); *G06N 3/065* (2023.01)
(58) Field of Classification Search
CPC ......... G06N 3/063; G06N 3/00; G06N 3/0464
See application file for complete search history.

(56) References Cited

U.S. PATENT DOCUMENTS

2020/0053299 A1* 2/2020 Zhang .................... H04N 25/00
2021/0051284 A1* 2/2021 Panicacci ............. H04N 25/443
(Continued)

FOREIGN PATENT DOCUMENTS

CN 111175239 A * 5/2020 ........... G06V 10/143

OTHER PUBLICATIONS

Mennel, L., Symonowicz, J., Wachter, S., Polyushkin, D., Molina-Mendoza, A., Mueller, T., (2019), Real-time image processing with a 2D semiconductor neural network vision sensor, https://arxiv.org/abs/1909.00205 (Year: 2019).*
(Continued)

*Primary Examiner* — Jennifer Mehmood
*Assistant Examiner* — Soumya Thomas
(74) *Attorney, Agent, or Firm* — CBM PATENT CONSULTING, LLC

(57) ABSTRACT

A retinomorphic array is used to convert visual information into electrical signals, and the neural network performs information processing on the input electrical signals to obtain the result of visual cognition; the perception and synchronous preprocessing of visual information is achieved through the retinomorphic array, avoiding the transmission of a large number of redundant visual information from the photoreceptor end to the image information processor, saving bandwidth resources, and improving the efficiency of visual information processing; the use of the crossbar array allows the configuration of a neural network with a more complex structure and more diverse functions, and the higher-level processing of visual information by the neural network realizes a novel neuromorphic vision system integrated therein with image recognition, dynamic tracking, and trajectory prediction.

8 Claims, 9 Drawing Sheets

(56) References Cited

U.S. PATENT DOCUMENTS

| | | | |
|---|---|---|---|
| 2021/0151678 A1* | 5/2021 | Lee | H10B 63/84 |
| 2022/0331952 A1* | 10/2022 | Miao | B25J 9/163 |
| 2024/0054177 A1* | 2/2024 | Miao | G06F 17/16 |
| 2024/0136461 A1* | 4/2024 | Miao | H10F 77/206 |

OTHER PUBLICATIONS

Nitta, Y., Ohta, J., Tai, S. and Kyuma, K. (1995), Optical neurochip for image processing. Electron. Comm. Jpn. Pt. II, 78: 10-20. https://doi.org/10.1002/ecjb.4420780102 (Year: 1995).*

* cited by examiner source-drain voltage back-gate voltage source-drain current
change

NEUROMORPHIC VISION SYSTEM

TECHNICAL FIELD

The present invention relates to the technical field of machine vision, and particularly to a novel neuromorphic vision system based on a retinomorphic array and a neural network.

BACKGROUND

Vision is the most major way for human-nature information interaction. About 80% external information is transmitted to the brain by virtue of vision. The visual center of retina and cerebral cortex are the main component and structure for forming vision. The retina is composed of photoreceptor and bipolar cells that are in a vertically layered distribution and synchronously perceives and pre-processing visual information through the flow of information between cells. The specific process is as follows: photoreceptor first convert incident visual information into electrical signals and transmit electrical information to bipolar cells; the bipolar cells allow a preliminary processing of the electrical information due to its positive and negative light responses and transmit processed electrical information to the visual center of cerebral cortex through an optic nerve. In this way, the retina realizes the perception of external visual information to a certain extent and simultaneously performs low-level visual information processing, such as edge enhancement, noise removal, contrast correction, and other operations. The visual center of cerebral cortex receives the processed visual information from the retina and performs high-level visual information processing, such as learning and inference. At the same time, the human eye not only has the powerful functions of simultaneous detection and processing of visual information but also requires an extremely low power consumption overall, far less than 20 watts, which is far beyond the enablement of existing machine vision technologies. With the gradual progress of information technology, constructing a class of vision chips that are comparable to the human eye and can realize real-time and low-power processing of visual information is quite essential to promote the development of applications of advanced technologies, such as human-computer interaction, autonomous driving, and intelligent security.

Traditional machine vision technology is mainly composed of a photoreceptor and an image information processor (internally including storage unit and processing unit) that exist separately from each other. Photoreceptors are mainly divided into two types: charge-coupled device (CCD) and complementary metal oxide semiconductor (CMOS) sensor, which are responsible for converting optical signals into electrical signals and transmitting the electrical signals to the image information processor or a computer for storage and operation. Compared with the human visual system, the machine vision technology with such a discrete architecture has obvious shortcomings in function, energy consumption, and latency. First, the photoreceptor transmits visual data information to the image information processor indiscriminately, which causes the image information processor to process a large amount of redundant visual data. Because of this, when dealing with a visual task with ultra-big data, there is a significant bandwidth congestion problem in the information transmission between the photoreceptor and the image information processor, accompanied by ultra-high latency and high power consumption. Furthermore, digital signal-based information storage and operation of a traditional digital circuit determine that the digital-to-analog/analog-to-digital conversion process is indispensable in the process of visual information transmission. Therefore, with the development of the Internet of Things and artificial intelligence, for the field of machine vision, it urgently needs to solve the contradiction between the exponential growth of visual information data and the inability of traditional visual information processing architectures to efficiently deal with a visual task with high data volume.

In view of this, compared with traditional machine vision, the human visual system always has an efficient, parallel, and low-energy visual information processing mode. To meet the urgent development needs of real-time and low-power visual information processing in the future, researchers urgently need to build a new system architecture, so that it is expected that novel brain-like vision chips with working performance similar to or even better than the human visual system can be developed in the future.

SUMMARY

Objective of the present invention: To overcome the deficiencies of the prior art, the present invention provides a novel neuromorphic vision system based on a retinomorphic array and a neural network, which solves the problems of high latency and high power consumption caused by the separation of physical architecture of the existing machine visual system and thus efficiently completes visual tasks such as image recognition, target tracking, and trajectory prediction.

Technical solution: A novel neuromorphic vision system includes a retinomorphic array and a neural network. The retinomorphic array is used to convert visual information into electrical signals, and the neural network performs information processing on the input electrical signals to obtain the result of visual cognition.

Further, including:

A serial to parallel conversion circuit is also arranged between the retinomorphic array and the neural network, which is used to convert the dimension of the electrical signals output by the retinomorphic array.

Further, including:

The retinomorphic array is planarly integrated by N×N optoelectronic devices whose gates are independently regulated. $N^2$ optoelectronic devices are regulated by $N^2$ independent back-gate voltage sources. The drain of each optoelectronic device is applied with a source-drain voltage, and the output is the sum of the source-drain current changes after M optoelectronic devices are connected in parallel, where $M \leq N^2$.

Further, including:

$N^2$ independent gates are each configured with a convolution kernel matrix with image preprocessing function, and the values in the convolution kernel matrices correspond to the back-gate voltage values applied on the various optoelectronic devices.

The image preprocessing function of the convolution kernel matrix changes with the change in the value of the convolution kernel matrix, and this matrix can realize the common convolution processing functions in computer vision, including edge enhancement, noise reduction, smoothing, sharpening, simple feature extraction, etc.

Further, including:

The neural network includes a nonvolatile crossbar array with adjustable resistance, and the intersection of each word line and bit line of the nonvolatile crossbar array is a nonvolatile memory, and the resistance of the nonvolatile memory is used as the weight value of a neural network synapse.

Further, including:

The nonvolatile memory is a memristor, a magnetic random access memory, a resistive random access memory, a phase change memory, a ferroelectric random access memory, or a flash memory.

Further, including:

The nonvolatile crossover array obtains an array with a specific inference function through pre-training, and a method of the pre-training is as follows:

When the multi-channel voltage signal input into the nonvolatile crossover array is higher than a set threshold voltage, the resistance of the nonvolatile memory changes, and the difference between the resistance before and after the change represents the synaptic weight value updated in each neural network training, thereby realizing the weight update function, and meeting the pre-training requirements;

When the multi-channel voltage signal input into the nonvolatile crossbar array is not higher than the set threshold voltage, the resistance of the nonvolatile memory will not change, and the summed current signal is output to realize the dot product operation function and satisfy the inference requirements.

Further, including:

The visual information is static visual information. The static visual information is converted into electrical signals by the retinomorphic array, and the converted electrical signals are input into the pre-trained nonvolatile crossbar array. During the inference process of the neural network, the nonvolatile memory receives the input from pre-neuron, performs the dot product operation, and transmits the result to post-neuron.

Further, including:

The visual information is dynamic visual information, and the observed dynamic target coordinate information is converted into two voltage signals by the retinomorphic array and input into the pre-trained nonvolatile crossbar array. During the inference process of the neural network, each nonvolatile memory receives the input of neuron at this moment from the neural network and the input of the hidden layer neuron at the previous moment, performs the dot product operation, and conducts the output of neuron at this moment.

Further, including:

The retinomorphic array and the neural network structurally use a three-dimensional (3D) vertical integration.

Beneficial effects: Compared with the prior art, the present invention has the following advantages: (1) The present invention first breaks through the limitation of separate layout of photoreceptors and image information processors in traditional machine vision in terms of physical architecture and combines optoelectronic device with neural network through crossbar array, simplifying the structure and saving the area of brain-like vision chip; (2) The perception and synchronous preprocessing of visual information are achieved through the retinomorphic array, avoiding the transmission of a large number of redundant visual information from the photoreceptor end to the image information processor, saving bandwidth resources, and improving the efficiency of visual information processing; (3) The use of the crossbar array allows the configuration of a neural network with a more complex structure and more diverse functions, and the higher-level processing of visual information by the neural network realizes a novel neuromorphic vision system integrated therein with image recognition, dynamic tracking, and trajectory prediction.

DETAILED DESCRIPTION OF THE EMBODIMENTS

Embodiment 1

Figure 1:
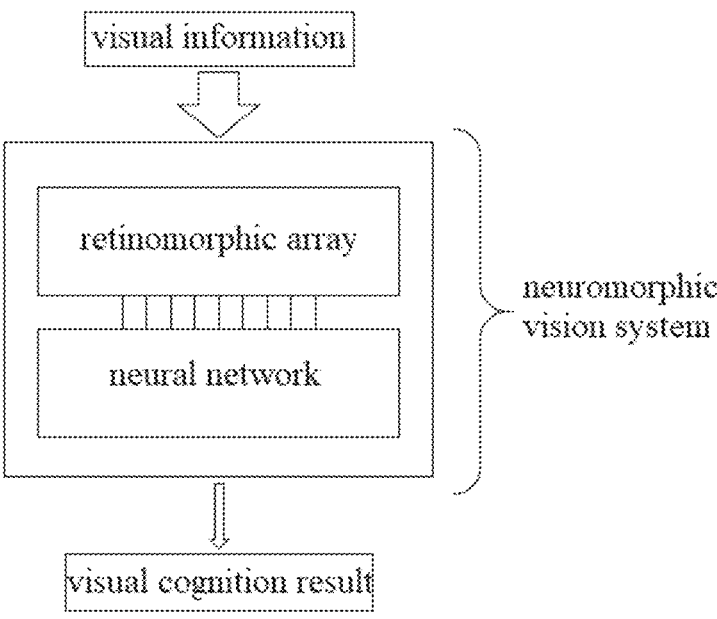
FIG. 1 is a schematic diagram showing the basic architecture of the neuromorphic vision system according to an embodiment of the present invention.

As shown in FIG. 1, the neuromorphic vision system of the present embodiment is composed of two major components: a retinomorphic array and a neural network. Visual information, when being input to the neuromorphic vision system, is first perceived by the retinomorphic array. The retinomorphic array is composed of optoelectronic devices with tunable photoelectric response magnitude and polarity. The optoelectronic devices can adopt the photoelectric sensor described in the patent document with the publication number of CN111370526A. The retinomorphic array composed of optoelectronic devices, under the configuration of different preprocessing functions, regulates each optoelectronic device response magnitude and polarity, thereby generating specific photoelectric signal conversion. The electrical signals that are converted by optoelectronic devices are subjected to a summation operation and then input to the neural network. Therefore, the retinomorphic array can be used for the perception of visual information and preprocess the visual information at the same time of perception. The neural network is integrated by a nonvolatile memory crossbar array. The electrical signals are input into the nonvolatile memory, and weight update and dot product operation are correspondingly performed, so that higher-level visual information processing functions can be implemented and visual cognition results are output.

The system emphasizes the structural and functional integrity of the retinomorphic array and the neural network, and detailed explanation and illustration is present below in accordance with the architectural order of the neuromorphic vision system in FIG. 1.

First, the optoelectronic devices mentioned above must meet the following requirements:

1. Optoelectronic devices should have photoelectric responses with adjustable magnitude and polarity, including but not limited to phototransistors with tunable positive and negative photocurrents dominated by photogenerated currents, photodiodes with tunable positive and negative photovoltaic effects dominated by photovoltaics, etc. Taking the internal charge carrier type of the semiconductor regulated by gate voltage as an example, specifically, when gate voltages of different polarities and magnitudes are applied to the device, the resulting photoelectric responses are different. The photoelectric response occurring when a positive gate voltage is applied is opposite in polarity to that when a negative gate voltage is applied, and the higher the gate voltage, the stronger the photoelectric response. When light is removed, all photoelectric responses quickly return to the initial state.

2. Under the regulation scene with same magnitude and opposite polarity, photoelectric signals output by optoelectronic devices should remain uniform and symmetrical in principle. Furthermore, during the design and fabrication of optoelectronic devices, special attention should be paid to the structural symmetry of the devices and the symmetry of charge injection into the active region of sample.

3. Each optoelectronic device in the retinomorphic array can be independently regulated. Taking the internal charge carrier type of the semiconductor regulated by gate voltage as an example, specifically, an independent gate voltage path should be configured for each optoelectronic device, and the point-to-point gate voltage regulation should be realized through an external switch circuit. Under the preprocessing scheme with corresponding functions, the retinomorphic array performs a summation operation for the variation of the electrical signal of each optoelectronic device, and inputs the electrical signal into the neural network.

4. Considering the structural and functional integrity of the brain-like vision chip, the effective electrical working range of the optoelectronic device should fit with the neural network, and the integration process of the optoelectronic device should be compatible with the neural network.

Figure 3:
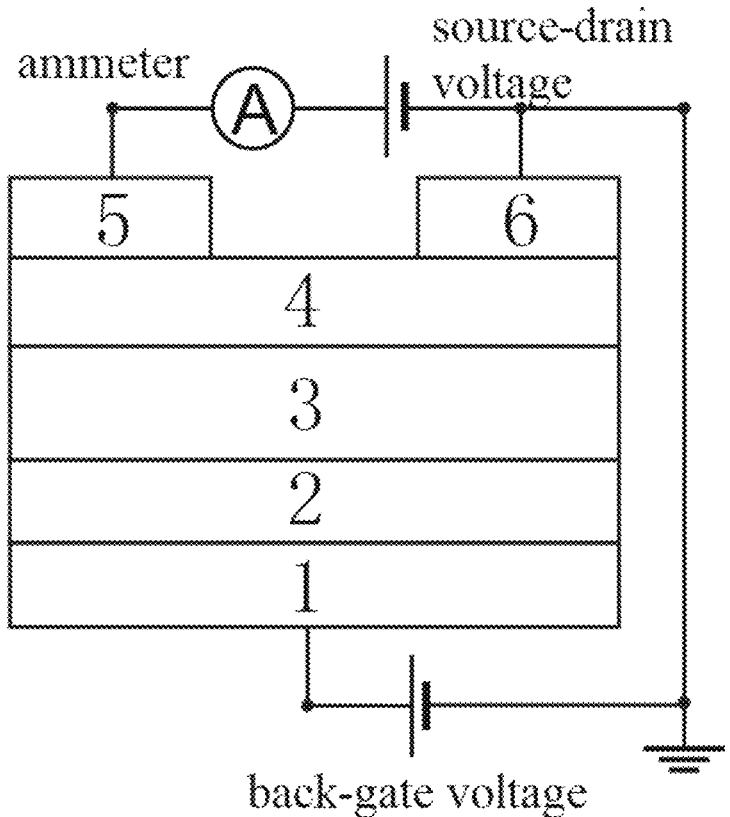
FIG. 3 shows the basic architecture and physical connection of the optoelectronic device constituting the retinomorphic array according to an embodiment of the present invention.

Specifically, the optoelectronic device has a photocurrent response with tunable magnitude and polarity. First, the retinomorphic array simulates the effect of retinal bipolar cells responding differentially to light signals, that is, when visual information is projected on the optoelectronic devices constituting the retinomorphic array, the optoelectronic devices can preprocess the visual information while performing photoelectric signal conversion because of its photoelectric response that is flexibly regulated by external factors. According to the patent document with the publication number of CN111370526A, the phototransistor as shown in FIG. 3 can be used in the present application. The phototransistor is formed by stacking a two-dimensional atomic layer 4, a two-dimensional atomic layer 3, and a gate dielectric material 2. A source 5 and a drain 6 of metal electrode as well as a bottom electrode 1 are deposited in accordance with the traditional transistor shape. The base has a vertically stacked heterojunction structure composed of the bottom electrode 1, dielectric layers 2 and 3, a channel layer 4, the source 5, and the drain 6. The source and the drain are arranged oppositely and placed at two ends of the channel layer. The materials of the bottom electrode, the source, and the drain are materials used in flexible electrodes, inert metals, or semimetals, the material of the dielectric layer is an insulating material, and the material of the channel layer is a bipolar material. The base includes a substrate and an insulating material layer grown on the surface of the substrate.

The primary requirement of the two-dimensional atomic layer 4 is to have excellent photoelectric properties, that is, the two-dimensional atomic layer 4 is required to be a semiconductor with a band gap matching the desired spectral wavelength (usually in the visible light range). In addition, the above material must be a bipolar material to ensure that the magnitudes of photocurrent changes obtained under positive and negative back-gate voltages are close. The greater the thickness of the material, the greater the photocurrent change. Comprehensively, the two-dimensional atomic layer 4 can be selected from molybdenum telluride, tungsten selenide, black phosphorus, etc., with the thickness ranging from 10 nm to 30 nm. The two-dimensional atomic layer 3 requires an insulator material, such as boron nitride, with the thickness being controlled in the range of 30 nm to 40 nm. The gate dielectric material 2, such as common aluminum oxide and silicon oxide, can be used in the phototransistor; in addition, it is necessary to consider the limitation of the maximum back-gate voltage of dielectric breakdown and the requirement for the photocurrent to quickly return to the initial state after light is removed. Comprehensively, the gate dielectric is allowed to have a thickness controlled in the range of 6 nm to 10 nm. The metal electrode is generally composed of inert metals such as palladium, gold, and platinum. Considering the bipolar field effect curve required for the two-dimensional atomic layer 4, the work functions of the metal electrode materials 5 and 6 used should be matched with the position of band edge of the two-dimensional atomic layer 4. Considering the adhesion of the metal electrode material to the substrate, the desired electrode material should be configured with a metal adhesion layer of about 2 nm to 5 nm in thickness.

The two-dimensional atomic layers 3 and 4 can be fabricated in batches by chemical vapor deposition, chemical vapor transport, molecular beam epitaxy, and other methods. The gate dielectric material 2 can be prepared by atomic layer deposition. The metal electrode materials 5, 6, and 1 can be prepared by electron beam evaporation, magnetron sputtering, and other methods. The preparation process is universal, which is compatible with the preparation process of the neural network in principle unless otherwise specified.

Figure 4:
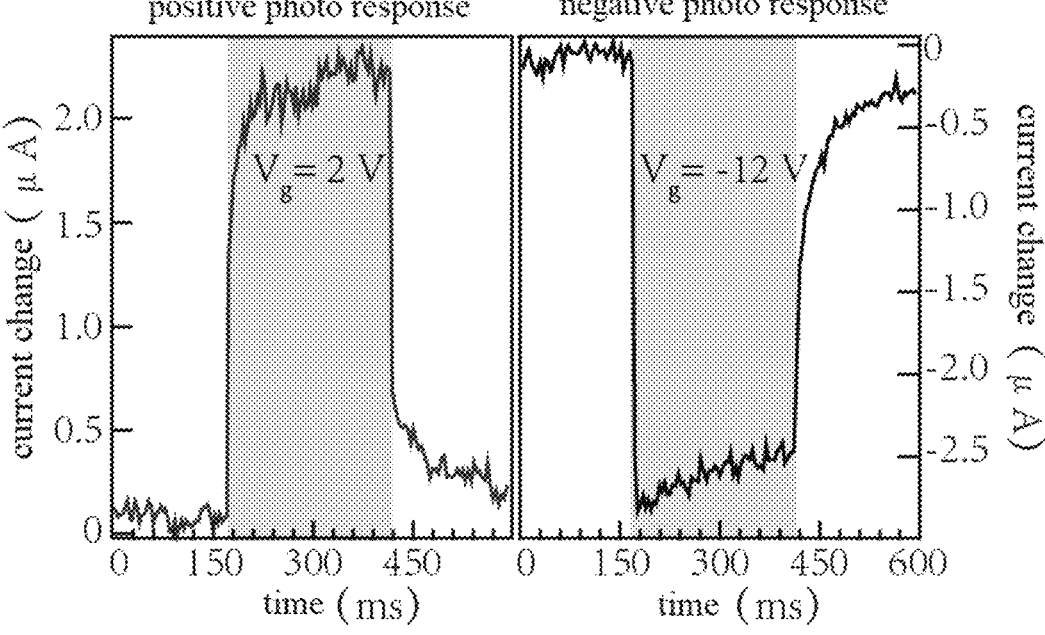
FIG. 4 shows the photocurrent response of the optoelectronic device under different back gate according to an embodiment of the present invention.

The above-mentioned optoelectronic device formed by stacking two-dimensional material tungsten selenide/boron nitride/gate dielectric aluminium oxide is tested. The wiring device for testing the back-gate tunable photocurrent response of a single optoelectronic device is shown in FIG. 3. A source-drain voltage is applied between the source and the drain, an ammeter is installed to measure the corresponding output current, and a back-gate voltage is applied to the gate. The photocurrent response is specifically shown in FIG. 4. When a positive back-gate voltage $V_g$ of 2 V is applied to the optoelectronic device, the source-drain current of the device suddenly increases when light is applied (shaded area, 250 ms) and quickly falls back to the initial current value level after the light is removed, showing a positive photocurrent response. When a negative back-gate voltage $V_g$ of −12 V is applied to the optoelectronic device, the source-drain current of the device suddenly decreases when light is applied and quickly rises to the initial current value level after the light is removed, showing a comparable negative photocurrent response. The magnitude of the photocurrent response of the optoelectronic device changes with the magnitude of the applied back-gate voltage, which meets the requirement of the optoelectronic response with tunable magnitude and polarity under back-gate regulation. In addition, the magnitude of the photocurrent response varies with the change in light wavelength and light intensity applied to the device.

Figure 2:
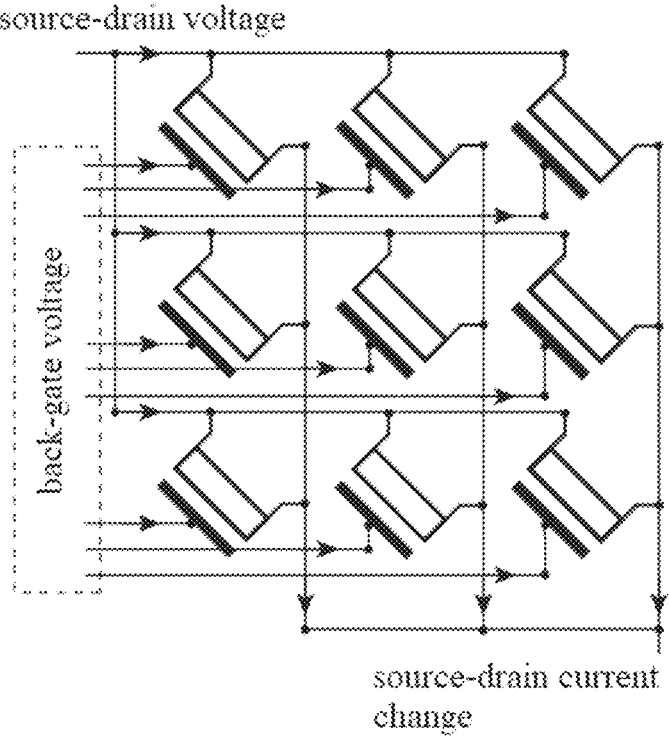
FIG. 2 shows the basic architecture and physical connection of the retinomorphic array according to an embodiment of the present invention.

The retinomorphic array is obtained by integrating a plurality of the above-mentioned optoelectronic devices. Extensive experiments and research show that the integration method of the following structure can realize the analysis of brain-like visual information and produce the optimal effect accordingly. The integration method is expressed as: The retinomorphic array is planarly integrated by N×N optoelectronic devices whose gates are independently regulated. $N^2$ optoelectronic devices are regulated by $N^2$ independent back-gate voltage sources. The drain of each optoelectronic device is applied with a source-drain voltage, and the output is the sum of the source-drain current changes after M optoelectronic devices are connected in parallel, where M≤$N^2$. FIG. 2 shows the basic architecture and physical connection of a 3×3 retinomorphic array. After the source and the drain of each optoelectronic device are connected in parallel, the same source-drain voltage is applied, the gate of each optoelectronic device is input with an independent back-gate voltage, and the output is the sum of the source-drain current changes of the nine optoelectronic devices. Therefore, the output is a one-dimensional electrical signal vector in multiple time series. Similarly, the integration method is not singular and invariable. According to Kirchhoff's law, changing the series-parallel mode of the optoelectronic devices in the array and inputting the source-drain voltage signal and the gate voltage signal can realize the information integration of output signal. The output is less than or equal to the sum of the source-drain current changes of the nine optoelectronic devices.

According to different image preprocessing functions, nine independent gates are configured with gate voltage matrices, and the values in the matrices correspond to the back-gate voltage values applied on the various optoelectronic devices. The image preprocessing function of the convolution kernel matrix varies with the change in value of the convolution kernel matrix, and this matrix can realize the common convolution processing functions in computer vision, including edge enhancement, noise reduction, smoothing, sharpening, simple feature extraction, etc. In the present embodiment, the back-gate voltage value can be a convolution kernel matrix with edge enhancement function and equal size to the retinomorphic array.

The convolution kernel matrix with edge enhancement function, such as Laplacian kernel $$\begin{pmatrix} 1 & 0 & 1 \\ 0 & -4 & 0 \\ 1 & 0 & 1 \end{pmatrix}.$$

8

Figure 5A:
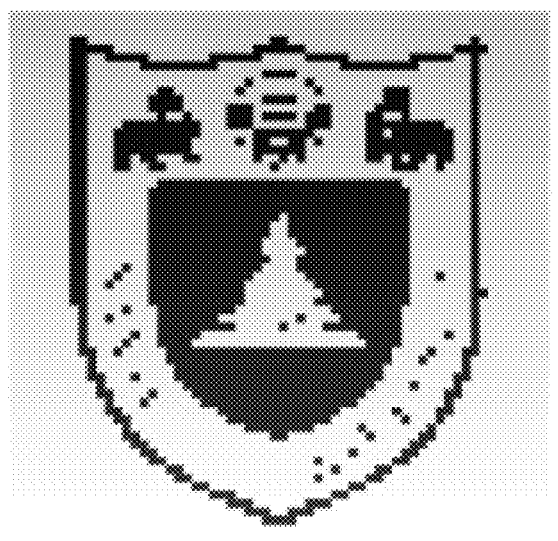
FIG. 5a shows the image processing effect of the retinomorphic array according to an embodiment of the present invention: an original image.
Figure 5B:
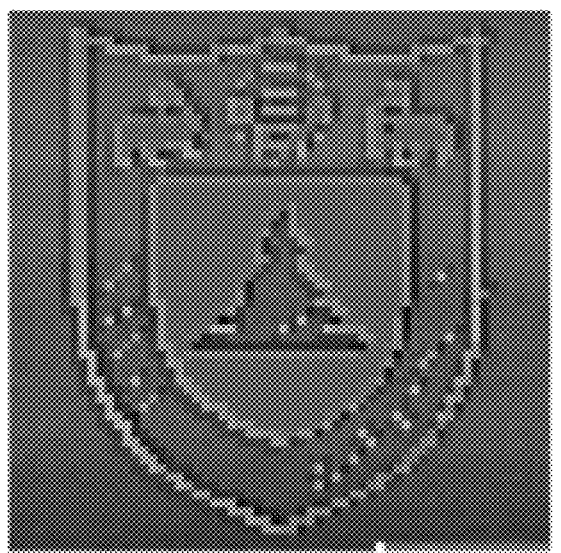
FIG. 5b shows the image processing effect of the retinomorphic array according to an embodiment of the present invention: an edge-enhanced image.

As shown in FIG. 5a, the logo of Nanjing University is input into the retinomorphic array as visual information, and the retinomorphic array is configured with the back-gate voltage value with edge enhancement function, then the logo of Nanjing University after edge enhancement processing will be obtained, as shown in FIG. 5b.

In the present embodiment, each optoelectronic device is connected to a customized three-pin (source, drain, gate) printed circuit board (PCB) by wire bonding process, and the three-pin PCB is fixed on a single-pole-multi-throw switch circuit. The source terminals of the nine devices are controlled to be in the switch channel A, and the drain terminals of the nine devices are controlled to be in the switch channel B, so that the source and drain ports of the nine devices can be arranged in parallel. In addition, by controlling the gates of the nine devices sequentially in the switch channels C, D, E, . . . , the independent power supply of the nine independent back-gate voltage sources can be realized.

In the case of a 3×3 retinomorphic array, the visual information input adopts the method of "segmentation-recombination" of image, and the image information to be input is divided into a group of 3×3 optical signal input sequences. As a result, according to the input order of the visual information, the retinomorphic array obtains the output electrical signals in turn under the control of the specific nine independent back-gate voltage sources. According to the order of the picture positions corresponding to the input optical signals, the electrical signals obtained after preprocessing are subjected to image recombination and restoration, or the electrical signals are input into the back-end nonvolatile memory crossbar array according to the order. It should be emphasized that this asynchronous information processing process will be improved by further expanding the size of the retinal array, eventually realizing synchronous information processing.

Taking the digital picture with the size of A×A derived from MINST dataset as an example, it can be divided into $A^2$ 3×3 optical signal sequences. After the optical signal sequences are processed by the retinomorphic array, an $A^2$×1 electrical signal output vector is obtained. The $A^2$×1 electrical signal output vector corresponds to the input vector of the neural network, and the electrical output is directly input to corresponding word line of the neural network in the form of a pulse signal for operations.

It should be pointed out that, with the further developed integrated fabrication process of retinomorphic array, the direct integration of large-area optoelectronic device array can replace the current complex wire bonding process and external switch circuit. Through the row and column selective control of the retinal morphological array, the direct conversion of photoelectric signals and information processing can be performed without image "segmentation-recombination". The specific processing methods are described below. Furthermore, the input method of picture information can be further extended to traditional exposure modes, such as global exposure, rolling shutter exposure, etc.

Figure 9:
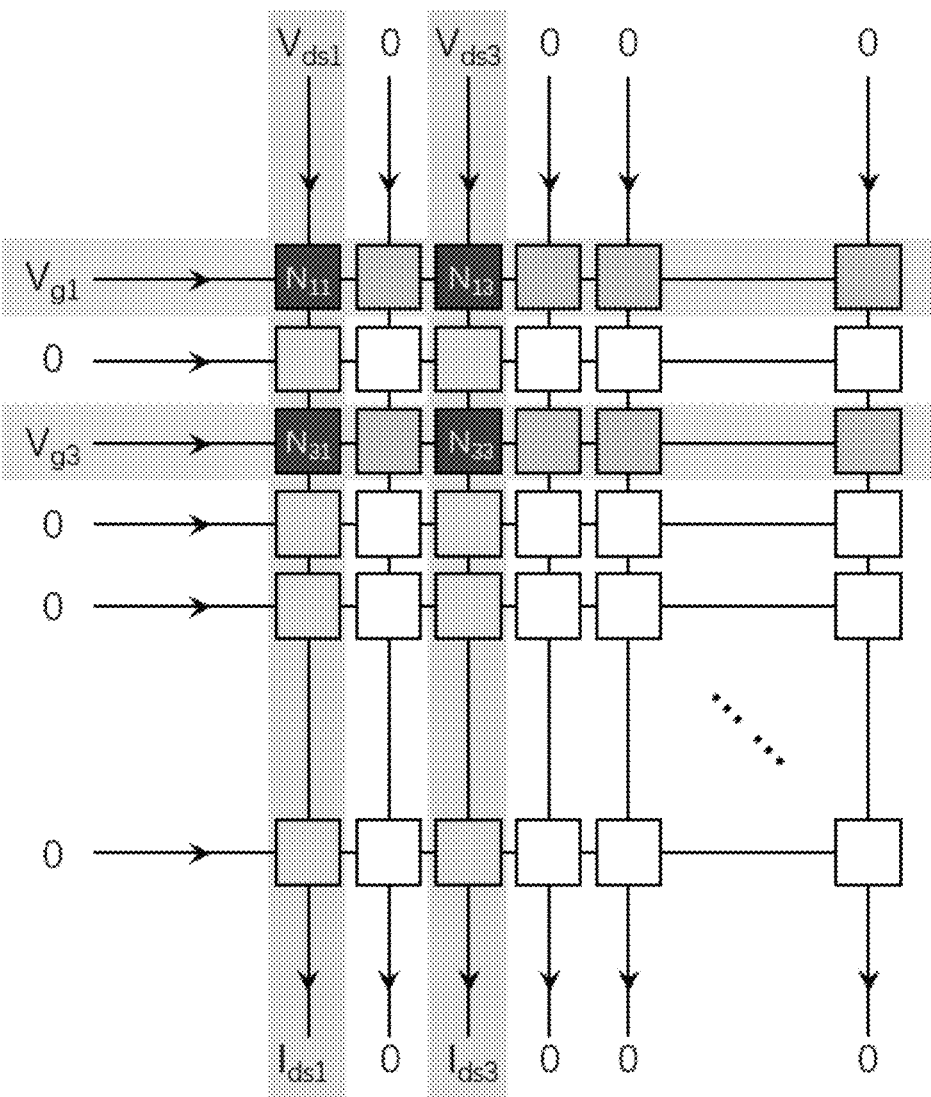
FIG. 9 is a schematic diagram showing operations of the large-scale integrated retinomorphic array according to an embodiment of the present invention.
Figure 10:
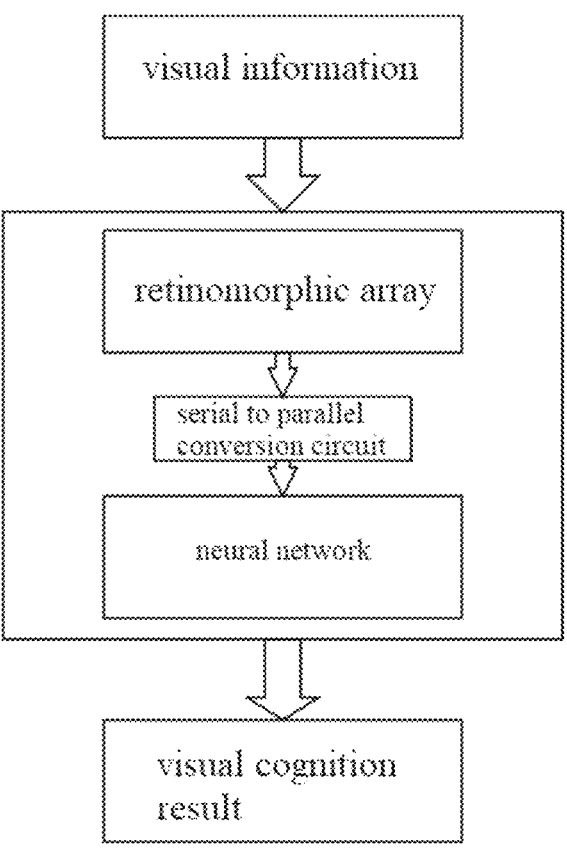
FIG. 10 is a schematic diagram showing the basic architecture of the neuromorphic vision system according to another embodiment of the present invention.

For a large-scale integrated N×N retinomorphic array, it is allowed to control the input of source-drain voltage signals and gate voltage signals of the entire row or entire column through row selection and column selection. The optoelectronic devices are combined in a column-parallel manner, that is, a source-drain voltage signal can simultaneously control the optoelectronic devices in a column and output a current signal; at the same time, a gate voltage is applied to the optoelectronic devices in a row-by-row manner. Therefore, the N×N image, after being preprocessed by the retinomorphic array, is reduced in dimension into an N×1 electrical signal output vector. The electrical output signal is directly used as the input signal of pre-neuron and input to the neural network. As shown in FIG. 9, the back-gate column vector of ($V_{g1}$, 0, $V_{g3}$, . . . ) and the source-drain voltage row vector of ($V_{ds1}$, 0, $V_{ds3}$, . . . ) are applied to the retinomorphic array, then the devices $N_{11}$, $N_{13}$, $N_{31}$, and $N_{33}$ generate a photoelectric response modulated by gate voltage under the excitation of light signals, and the remaining devices ($N_{xy}$, (x≠1, 3; y=1, 3)) generate a photoelectric response without gate voltage modulation. Therefore, under this operation, the current effective information output by the retinomorphic array is the source-drain current row vector of ($I_{ds1}$, 0, $I_{ds3}$, . . . ).

The neural network mimics the function of human visual cortex to perform higher-level image processing on information from the retina. The neural network receives the electrical signals output after the preprocessing by the retinomorphic array. The neural network is configured with a nonvolatile crossbar array with adjustable resistance, and each intersection is a nonvolatile memory, including but not limited to a memristor, a resistive random access memory, a magnetic random access memory, a phase change memory, a ferroelectric random access memory, a flash memory, etc. The input electrical signal and the weight in the nonvolatile memory are updated or subjected to dot product operation, and the electrical signal is output. A single nonvolatile memory should have stable switching endurance, multi-state switchability, lower device variability in crossbar array, and higher integration density and yield.

The memristor meets the configuration requirements of nonvolatile memory. The electrode materials of common metal oxide memristors are composed of tantalum and palladium, and the switching layer materials are composed of tantalum oxide and hafnium oxide. Correspondingly, the memristor crossbar array is composed of criss-crossed word lines and bit lines and memristors at the intersections.

The memristor crossbar array has the following properties:

1. A single memristor has stable switching endurance and multi-state switchability;
2. The memristor crossbar array has lower device variability and higher integration density and yield;
3. The memristor crossbar array usually has a non-linear current-voltage relationship. Each memristor is allowed to be configured with one transistor, so that the memristor crossbar array outputs a linear current-voltage relationship.
4. In particular, the size of the crossbar array limits the function of the neural network. To configure a neural network with more complex structure and more diverse functions, the size of the memristor crossbar array should be maximized, in principle larger than 128×64.
5. The fabrication process of the memristor crossbar array is compatible with the retinomorphic array in principle, and the electrical working range should be adapted to the retinomorphic array.
6. The memristor crossbar array is allowed to undergo a structurally monolithic vertical integration with the retinomorphic array, which can save the use area of brain-like vision chips to the greatest extent.
7. When the memristor crossbar array is configured with functions, the dot product operation function, i.e., inference function, is more important. The memristor crossbar array is a pre-trained array with specific inference function after weight update at large voltage. Further, the array outputs the calculated current result only by subjecting the intersection of input voltage and corresponding resistance to dot product. It should be stressed that although the memristor crossbar array is a neural network with specific inference function, it should retain the feature of function reconfiguration. In other words, it can be functionally reconfigured according to different visual information processing requirements.

Figure 6:
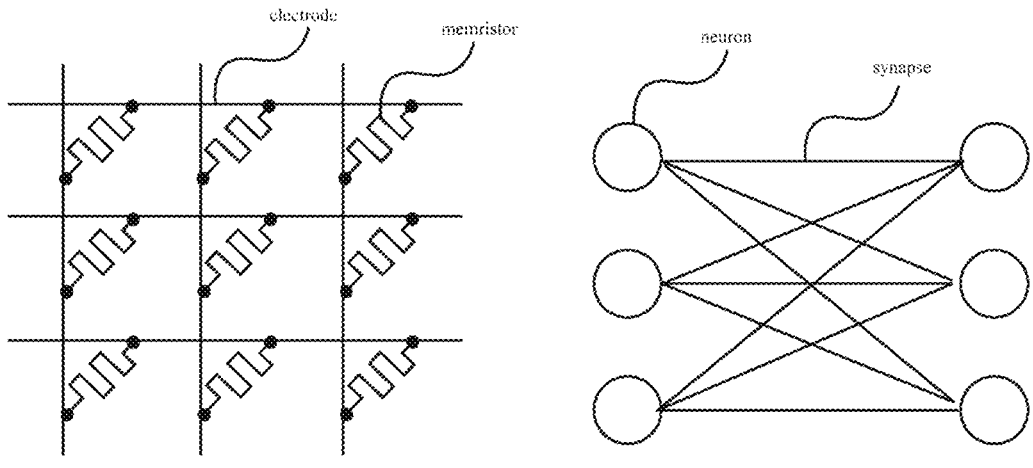
FIG. 6 is a comparison diagram of the structure of the memristor crossbar array exemplified in an embodiment of the present invention and the structure of a one-layer fully connected neural network.

As shown in FIG. 6, a cross circuit structure is constructed using this memristor, which is equivalent to the structure of a one-layer fully connected neural network. The left figure is a 3×3 memristor crossbar array and the right figure is a 3×3 one-layer fully connected neural network with the same topology. The two structures are completely the same when regarding the memristor as synapse and the electrode endpoint as neuron endpoint. The electrical signal output from the retinomorphic array is directly used as the input signal of pre-neuron and input into the neural network, and after passing through the memristor crossbar array circuit, the output signal is the product of the input signal and the weight matrix stored in the memristor array.

At the hardware aspect, the specific implementation of the neuromorphic vision system to achieve three-dimensional vertical integration is as follows: the upper layer is the retinomorphic array, and the lower layer is the neural network. The advantage of the present embodiment is that there is no need for an intermediate serial to parallel conversion circuit, and the electrical signal transmission between the upper and lower layers can be directly realized.

Research and experiments show that the above-mentioned visual system can realize new cognition of static visual information and dynamic vision. At present, those skilled in the art use crossbar array for trajectory prediction analysis, but there is still devoid of perception and synchronous preprocessing of visual information by the retinomorphic array. As a result, there is a lot of redundant visual information in the transmission process, wasting bandwidth resources, and leading to low efficiency of visual information processing.

In the present embodiment, the input visual information may be static visual information, such as image processing. The intersection of each word line and bit line of the memristor crossover array is a nonvolatile memory, which, as a synapse in the neural network, is responsible for receiving the input from pre-neuron, such as the electrical signals directly sent to the neural network by the retinomorphic array, and transmitting the output to post-neuron. The resistance of the memristor is the weight value of the synapse of the neural network. At a small voltage (below a threshold voltage), the resistance of the memristor does not change, and the multi-channel voltage signal input into the memristor array, based on Kirchhoff's law and Ohm's law, outputs the summated current signal, thereby realizing the dot product operation function in the forward-propagation process of the neural network. At a large voltage (higher than the threshold voltage), the resistance changes, and the difference of the resistance before and after the change represents the synaptic weight value updated in each training, thereby realizing the weight update function in the back-propagation process of the neural network. As described in the following paragraph, the memristor crossbar array is configured as an artificial neural network to realize static image recognition.

In the present embodiment, the 'N', 'J', and 'U' letter set added with noise is used for the image recognition of the neuromorphic vision system, and the letter set contains a total of 2100 letter pictures. To improve the noise resistance of the neuromorphic vision system to this letter set, the retinomorphic array is configured with a back-gate voltage matrix. The transformed voltage signal is input into the memristor crossbar array. The configured artificial neural network is a network with one input layer, one hidden layer, and one output layer. The number of neurons required for the input layer is consistent with the dimension of the output vector of the retinomorphic array, the hidden layer is configured with thirty-seven neurons in total, and the output layer is configured with ten neurons. In addition, the output of the memristor crossbar array needs further non-linear activation to increase the stability and gradient of the output signal. This process requires a signal rectifier unit connected externally to the memristor crossbar array, or is implemented by computer software simulation. In the present embodiment, the rectifier unit is implemented by computer software simulation as the activation function of the hidden layer. The weight update method of the artificial neural network is the error back-propagation algorithm. The error is determined by calculating the output cross-entropy loss function, and then the weight is updated by the optimization algorithm of root mean square propagation.

Figure 7:
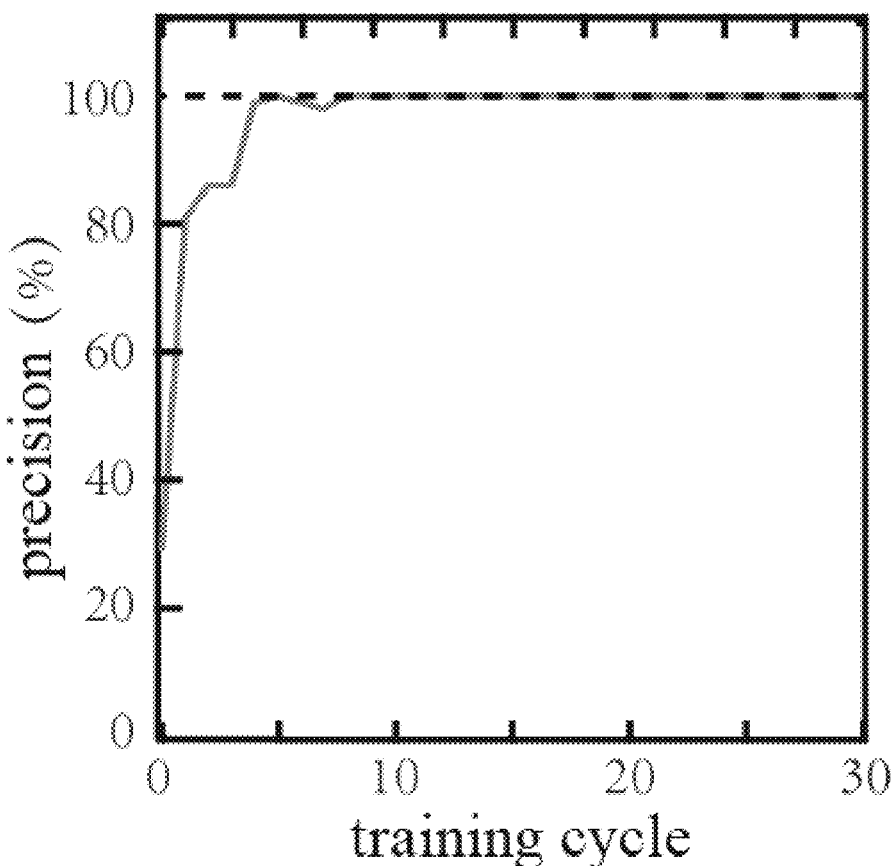
FIG. 7 shows the recognition rate of static visual information by the neuromorphic vision system according to an embodiment of the present invention.

As shown in FIG. 7, the artificial neural network based on the memristor crossbar array exhibits a recognition rate close to 100% within 30 training cycles. The resistance of the memristor crossbar array is pre-trained and can be used directly for the recognition of noisy letter set.

In the present embodiment, the input visual information may be dynamic visual information, and its specific application scenario, for example, is vehicle trajectory prediction. The recurrent neural network has a memory function and is suitable for processing time series information. In the recurrent neural network, the input of the neuron at the current moment and the output of the hidden layer at the previous moment are input into the hidden layer at the current moment. That is, when the next moment comes, the state of the network neurons is determined not only by the input at this moment but also by the neuron state at the previous moment. Subsequent situations are similar until the end of the time series. The memristor crossbar array also performs the functions of dot product operation and weight update while implementing the recurrent neural network. As described in the following paragraph, the memristor crossbar array is configured as a recurrent neural network to process dynamic visual information.

The configured recurrent neural network has two input neurons (the coordinate information x and y of the observed dynamic target are directly input to the neural network by the retinomorphic array), ten hidden neurons, and two output neurons (the neural network outputs the possible coordinates x and y of the dynamic target at the next moment). The coordinate information of the observed dynamic target is converted into two voltage signals which are input into the recurrent neural network based on the memristor crossbar array. The linear dot product operations in the recurrent neural network are all performed in the analog domain by the memristor crossbar array. The result output by the memristor is activated by the nonlinear unit, and finally two current signals are output. The magnitude of the current signal is proportional to that of the coordinates, and is used to reflect the coordinate information at the next moment. The weight update method of the recurrent neural network is a time-based back-propagation algorithm. The root mean square error is calculated on the software to obtain the weight to be updated, and the weight of the recurrent neural network based on the memristor crossbar array is updated by controlling the voltage signal applied by the peripheral circuit. The loss function will continuously decrease with the increase of training times, so that the predicted trajectories continue to approach the experimentally measured trajectories. For the trained recurrent neural network, it can be directly used to predict trajectories.

Figure 8:
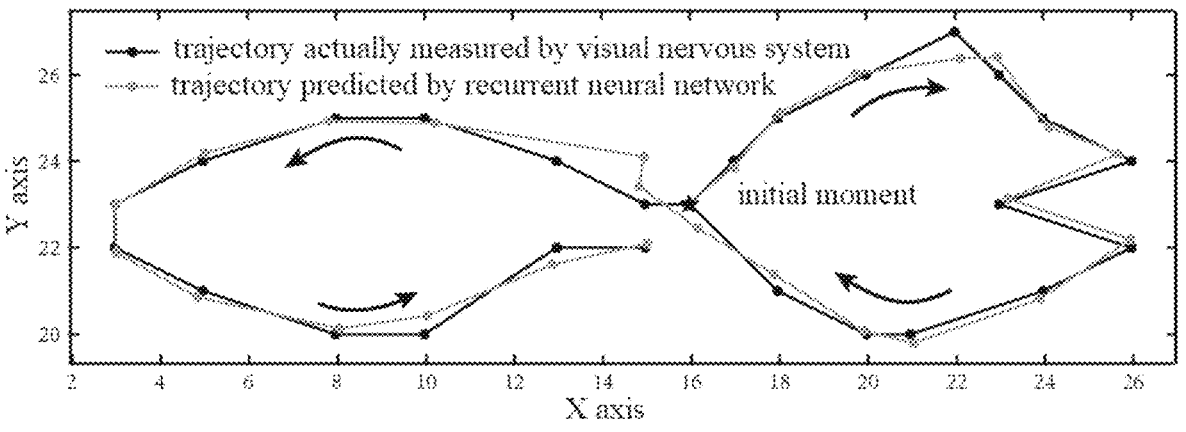
FIG. 8 shows the comparison of trajectory detection and trajectory prediction of dynamic visual information by the neuromorphic vision system according to an embodiment of the present invention.

As shown in FIG. 8, through the perception of a target object by the front-end retinomorphic array, the neuromorphic vision system can capture the motion trajectory of the target object (black broken line). The motion trajectory of the target object is used as a training set and input to the above recurrent neural network for training, which can predict, at the current moment, the location of the target object at the next moment. The motion trajectory of the target object predicted by the recurrent neural network is shown by the gray broken line in FIG. 8.

It should be pointed out that the implementation scheme given above is only a scheme configured at the laboratory level. In the industrial production process, crossbar arrays with adjustable weight can be produced according to actual operating conditions to achieve the purpose of higher-level processing of visual information, which all belong to the protection scope of the present application unless violating the spirit of the above embodiment.

Embodiment 2

The present embodiment is basically the same as Embodiment 1, except that a serial to parallel conversion circuit is added between the retinomorphic array and the neural network on the basis of Embodiment 1, which records the clock cycle of electrical signal. The signal, after being integrated, is transmitted to the neural network in the next clock cycle. For example, for a 3×3 retinomorphic array, the B×B image input and synchronous preprocessing are completed according to the light signal sequence to obtain a $B^2 \times 1$ electrical signal output vector. The electrical signal output passes through the serial to parallel conversion circuit and becomes a $1 \times B^2$ electrical signal input vector, and the dimension corresponding to the size of the memristor crossbar array is not less than the dimension of the converted parallel vector.

At the hardware aspect, as shown in FIG. 109, the specific implementation of the neuromorphic vision system to achieve vertical integration is as follows: the top layer is the retinomorphic array, the middle layer is the serial to parallel conversion circuit based on traditional CMOS technology, and the bottom layer is the neural network. The advantages of the present embodiment are that the traditional CMOS-based serial to parallel conversion circuit has a developed fabrication process, convenient operation, and high functional configuration flexibility.

What is claimed is:

1. A novel neuromorphic vision system,
   comprising a retinomorphic array and a neural network,
      wherein the retinomorphic array and the neural network structurally use a three-dimensional (3D) vertical integration, the retinomorphic array is used to convert visual information into electrical signals, and the neural network performs information processing on input electrical signals to obtain a result of visual cognition, and the neural network is configured by a nonvolatile crossbar array with adjustable resistance;
   wherein the visual information is dynamic visual information, and observed dynamic target coordinate information is converted into two voltage signals by the retinomorphic array and input into a pre-trained nonvolatile crossbar array, and during an inference process of the neural network, each nonvolatile memory of the nonvolatile crossbar array, receives an input of a neuron from a current moment from the neural network and an output from a hidden layer neuron at a previous moment, performs a dot product operation and conducts an output of the neuron at this moment.

2. The novel neuromorphic vision system according to claim 1, wherein a serial to parallel conversion circuit is further arranged between the retinomorphic array and the neural network and used to convert a dimension of the electrical signals output by the retinomorphic array.

3. The novel neuromorphic vision system according to claim 1, wherein the retinomorphic array is planarly integrated by N×N optoelectronic devices whose gates are independently regulated, and $N^2$ optoelectronic devices are regulated by $N^2$ independent back-gate voltage sources, and a drain of an optoelectronic device is applied with a source-drain voltage, and an output is a sum of source-drain current changes after M optoelectronic devices are connected in parallel, $M \leq N^2$.

4. The novel neuromorphic vision system according to claim 1, wherein $N^2$ independent gates are each configured with a convolution kernel matrix with image preprocessing function, and values in the convolution kernel matrices correspond to the back-gate voltage values applied on the various optoelectronic devices, and the image preprocessing function comprises edge enhancement, noise reduction, smoothing, sharpening, or simple feature extraction.

5. The novel neuromorphic vision system according to claim 1, wherein an intersection of each word line and bit line of the nonvolatile crossbar array is a nonvolatile memory, and resistance of the nonvolatile memory is used as a weight value of a neural network synapse.

6. The novel neuromorphic vision system according to claim 5, wherein the nonvolatile memory is a memristor, a magnetic random access memory, a resistive random access memory, a phase change memory, a ferroelectric random access memory, or a flash memory.

7. The novel neuromorphic vision system according to claim 5, wherein the nonvolatile crossover array obtains an array with a specific inference function through pre-training, and a method of the pre-training is as follows:

when a multi-channel voltage signal is input into the nonvolatile crossbar array is higher than a set threshold voltage, the resistance of the nonvolatile memory changes, and a difference between the resistance before and after represents the synaptic weight value updated in each neural network training, thereby realizing a weight update function, and meeting pre-training requirements;

when the multi-channel voltage signal input into the nonvolatile crossbar array is not higher than the set threshold voltage, the resistance of the nonvolatile memory will not change, and a summed current signal is output to realize the dot product operation function and satisfy the inference requirements.

8. The novel neuromorphic vision system according to claim 7, wherein the visual information is static visual information, the static visual information is converted into the electrical signals by the retinomorphic array, and the converted electrical signals are input into the pre-trained nonvolatile crossbar array, during the inference process of the neural network, the nonvolatile memory receives the input from a pre-neuron, performs the dot product operation, and transmits the result to a post-neuron.

\* \* \* \* \*